United States Patent
Hendrickson et al.

[11] Patent Number: 6,139,613
[45] Date of Patent: Oct. 31, 2000

[54] MULTILAYER PIGMENTS AND THEIR MANUFACTURE

[75] Inventors: William A. Hendrickson, Stillwater; James J. Marti, St. Paul, both of Minn.

[73] Assignee: Aveka, Inc., Woodbury, Minn.

[21] Appl. No.: 09/138,482

[22] Filed: Aug. 21, 1998

[51] Int. Cl.[7] .......................... B32B 18/00; B32B 27/00; B32B 33/00

[52] U.S. Cl. .................. 106/415; 106/493; 427/255.7; 427/215; 427/220; 427/222; 427/258; 427/372.2; 427/384; 427/397.7; 427/407.7; 427/419.1; 427/419.2; 427/419.7; 427/420; 428/363; 428/411.1; 428/195; 428/689; 428/699

[58] Field of Search ...................... 106/415, 493; 427/255.7, 215, 220, 222, 258, 372.2, 384, 397.7, 407.1, 419.1, 419.2, 419.3, 420; 428/363, 411.1, 195, 689, 699

[56] References Cited

U.S. PATENT DOCUMENTS

| | | | |
|---|---|---|---|
| Re. 31,780 | 12/1984 | Cooper et al. | 428/212 |
| 3,627,553 | 12/1971 | Clark et al. | 106/415 |
| 3,801,429 | 4/1974 | Schrenk et al. | 161/181 |
| 4,310,584 | 1/1982 | Cooper et al. | 428/212 |
| 4,434,010 | 2/1984 | Ash | 106/415 |
| 5,089,318 | 2/1992 | Shetty et al. | 428/212 |
| 5,451,449 | 9/1995 | Shetty et al. | 428/195 |
| 5,571,624 | 11/1996 | Phillips et al. | 106/415 |
| 5,641,544 | 6/1997 | Melancon et al. | 427/331 |

*Primary Examiner*—C. Melissa Koslow
*Attorney, Agent, or Firm*—Schwegman, Lundberg, Woessner & Kluth, P.A.

[57] ABSTRACT

The present invention describes a novel method for the formation of optically variant pigments by the coating of layers onto a substrate and the fracturing of the coated material into pigment particles after the coating operation and novel pigments produced thereby. Coating techniques such as slot die coating (especially multiple slot die coating), spin coating, meniscus coating, curtain coating, and the like have proven successful. It is preferred that multiple die slots are used to coat multiple layers in a single pass so that manufacturing costs are minimized. The use of these coating techniques, and especially multiple die slot coating, allows for many layers to be coated, with from three to fifty layers being readily possible. This offers a relatively inexpensive way of coating out a wide variety of layers, and especially the pigment materials needed for optically variable pigments, quickly and with high quality. The coating materials may be sols, polymers, composites, reactive mixtures and the like, including combinations of these materials. The properties of the optically variable pigment are determined by the composition, properties and thickness of the coated layers.

28 Claims, 4 Drawing Sheets

1. 091706 G/Si/Zr/Si/Zr        MASKED
   10/ 0 TO 60/ 0 STEP 5

2. 090502 G/P/Zr/P/Zr/P        MASKED
   10/ 0 TO 60/ 0 STEP 5

3. 091709 G/Si/Zr  250C        MASKED
   10/ 0 TO 60/ 0 STEP 5

1. 091704 WAFER Si/Zr    1 CM O.C. MASKED
   10/ 0 TO 60/ 0 STEP 5

MULTILAYER PIGMENTS AND THEIR MANUFACTURE

BACKGROUND OF THE INVENTION

1. Field of the Invention

The present invention relates to pigments and optical sheeting, particularly multilayer pigments and multilayer optical sheeting, more particularly multilayer pigments and sheets with optically variable properties.

2. Background of the Art

Pigments are materials, which are added to other materials to create a visual effect, usually the provision of color to an observer. As opposed to dyes, pigments are differentiated by their lack of solubility in the medium within which they may be carried. The same compounds may therefore be pigments in one medium and dyes in another. Pigments absorb radiation and allow non-absorbed radiation to be transmitted through them or to be reflected off the pigment to provide the appropriate color.

Pigments are substantial items of commerce, being used in millions of metric tons per year (especially if traditional white and black fillers such as titania, silica, zinc oxide, carbon black, etc. are considered as pigments). Pigments are used in paints, fabrics, polymer coatings, inks, toners, ceramics, articles of manufacture (e.g., watches, floppy disks, identification cards, credit cards, rubber items, etc.), decorative materials, and the like.

One type of pigment is alternatively referred to as a luster pigment, optically variable pigment, internal reflectance/refraction pigment, internal reflection/interference pigment, effect pigments, plate-like pigments, etc. These pigments differ in the mechanism by which they fundamentally create the color values when light interacts with them. Rather than directly absorbing limited ranges of the wavelengths of light which strike the pigments, luster pigments provide three types of interactions with visible radiation which results in alteration of the viewable light leaving the pigments. The three types of interactions with light include 1) mirror reflection, in which light is reflected off the surface of the pigment, 2) absorption, transmission and reflection of light by the bulk composition of the pigment (an internal effect), and 3) interference and reflection. The optical effects that operate in luster pigments are the same principal involved in the multicolor effects one sees in soap bubbles. The colors observed in a soap bubble are various merging interference colors which are strongly angle dependent hues. The same optical effects are viewed in thin films of inorganic materials such as silica and magnesium fluoride, which are quite suitable for the pigment industry, while titania has a high refractive index. In the art, low refractive index materials are often referred to as dielectric materials (irrespective of their electrical insulating or storage properties) because many dielectrics are non-absorbing and low refracting. The interference colors of these types of materials are highly angle dependent as explained by Snell's Law:

$$n_0 \sin \alpha = n_1 \sin \beta$$

wherein $n_0$ is the refractive index of air and $n_1$ is the refractive index of the substantive material. Snell's Law correlates the refractive angles and the refractive indices. FIG. 1 shows two layers of a single article through which light rays pass at a face angle and a grazing angle. In the case of materials with low indices of refraction, the bending of the rays with respect to the perpendicular would be slight and the difference between pathlengths of the two rays would be high. This results in interference conditions for face angle rays and for grazing angle rays which are completely different, producing strongly angle dependent colors.

Optically variable pigments have been produced by providing these physical effects into pigments. These pigments were first described in U.S. Pat. No. 3,438,796, and later described in U.S. Pat. Nos. 4,434,010; and 5,401,306 and EP Publications 395 410 and 708 154 and German Patent No. 195 25 503. Plate-like iron oxide pigments have been produced comprising an inner reflector plate-like $Fe_2O_3$ seed, a low reflectance $SiO_2$ layer, and a selective reflective $Fe_2O_3$ exterior layer. Aluminum based optically variable pigments ($Al/SiO_2/Fe_2O_3$) have also been provided as totally reflecting Aluminum cores, a low reflectance SiO2 layer, and a selective reflective $Fe_2O_3$ exterior layer (e.g., 25 nm layer thickness). The apparent color provided by the face angle and the grazing angle will depend upon both the thickness of the $SiO_2$ layer and the angle of viewing. The colors may vary from greenish gold (320–350 nm layer thickness) to red (380–400 nm layer thickness) to violet (410–420 nm layer thickness) to weak copper (430–440 nm layer thickness) in the face angle color with the (varying $SiO_2$ layer thicknesses). Similarly, the grazing angle color will vary from reddish gray (320–350 nm layer thickness) to gold (380–400 nm layer thickness) to green (410–420 nm layer thickness) to weak red (430–440 nm layer thickness) with the thickness of the $SiO_2$ layer. The literature provides two primary methods of synthesizing optically variable pigments, physical vapor deposition (PVD) and the chemical coating/deposition of layers onto particles or flakes as wet chemical vapor deposition (CVD).

Physical vapor deposition is performed by the vaporization of the material to be deposited as layers, with each layer of material being separately vaporized and then deposited on the substrate. Chemical vapor deposition similarly lays down each layer separately and has been performed by suspension of flakes in a carrier medium (e.g., alcohol), and the addition of a reducible silane (e.g., tetraethoxysilane and ammonia) is performed. The resulting hydrolysis product condenses and forms an $SiO_2$ layer as a smooth film on the substrate. Alternatively the $SiO_2$ layer is deposited from a fluidized bed reactor. Special precursors other than the tetraethoxysilane are desirable for this reaction. After deposition of the $SiO_2$ layer, metal oxide or metal film coatings are applied. This is usually done in a fluidized bed reactor, where gaseous metal carbonyls are decomposed at elevated temperatures (e.g., about 200° C.), forming smooth thin films on the $SiO_2$ layer surfaces. Carbonyls such as aluminum, chromium, molybdenum and tungsten are commonly used in this process.

One example of a synthetic resin-coated pigment using chemical deposition means is U.S. Pat. No. 5,332,767 wherein a synthetic resin coated pigment such as aluminum having a siloxane coating covalently bonded to the surface of the pigment particles is formed by hydrolysis and condensation of the silicon-organic coated on the particles. Similarly, U.S. Pat. No. 5,261,955 describes colored metal flakes manufactured by coating metal oxide sols onto the flakes, and thereafter heating the flakes to impart visible colors.

Multiple layer coatings on substrates are also taught in U.S. Pat. No. 5,182,143 wherein a coating solution contains two or more dissimilar hydrolyzable and condensable organometallic compounds which differentially condense into different layers.

U.S. Pat. No. 5,500,313 makes general reference to slot coating as an alternative in the manufacture of holographic flake pigment. The materials are coated, imaged and then converted into particulates for subsequent inclusion in binders.

U.S. Pat. No. 5,641,544 describes a method for forming ultrathin coatings of liquid onto substrates and discloses a multiple slot die coating system in which multiple layers of liquids are simultaneously deposited onto a surface. Amongst the materials described as being coatable by the process (column 8, lines 3–32) are optically active coatings, reflective sheeting, functional coatings, and the like. The coating fluids described include solutions, solid-fluid dispersions, fluid mixtures and emulsions.

U.S. Pat. No. 4,445,458 describes a novel head for a slot die coater, and generally describes slot die coating processes forming metered beads.

Vapor deposition and chemical deposition processes are time consuming, energy intensive, require strict environmental control, and are expensive for the formation of essentially low technology staples such as pigments. Improved processes for the formation of optically variable pigments are desirable.

BRIEF DESCRIPTION OF THE INVENTION

The present invention describes a novel method for the formation of optically variant pigments by the coating of layers onto a substrate and the fracturing of the coated material into pigment particles after the coating operation. Coating techniques such as slot die coating (especially multiple slot die coating), slide coating, spin coating, meniscus coating, curtain coating, and the like have proven successful. It is preferred that multiple die slots or slide coating with multiple layers coated at one time are used to coat multiple layers in a single pass so that manufacturing costs are minimized. The use of these coating techniques, and especially multiple die slot coating and slidecoating, allows for many layers to be coated, with from three to thirty layers being readily possible and three to twenty-five or three to twenty layers being preferred, with five or six to fifteen layers being most preferred. This offers a relatively inexpensive way of coating out a wide variety of layers, and especially the pigment materials needed for optically variable pigments, quickly and with high quality. The coating materials may be sols, polymers, composites, reactive mixtures and the like, including combinations of these materials. The properties of the optically variable pigment are determined by the composition, properties and thickness of the coated layers.

The pigments of the invention are themselves novel in appearance. The pigments display fractures along a substantial portion of the perimeters and do not have continuous coatings of layers which cover all exterior surfaces of the pigment particles.

DETAILED DESCRIPTION OF THE INVENTION

Figure 1:
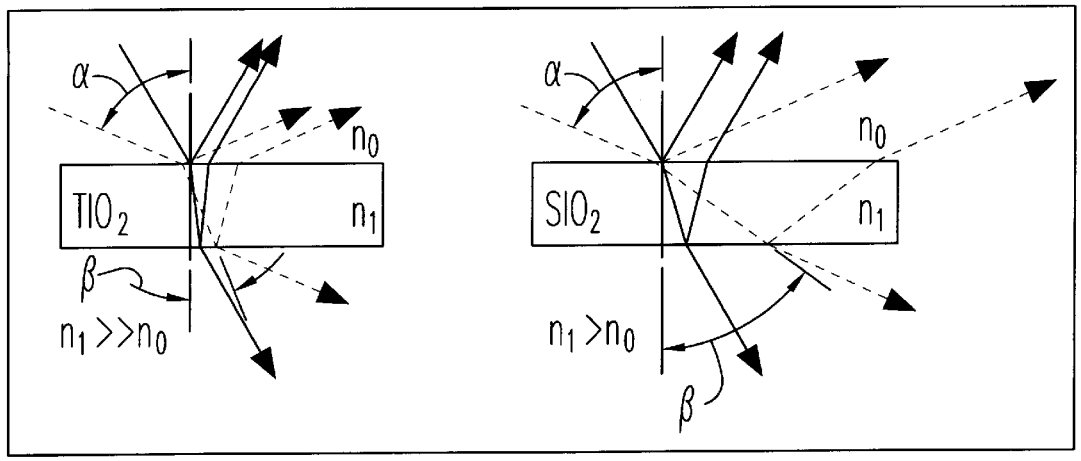
FIG. 1 shows a layer displaying diffraction patterns according to Snell's Law.

Coating is normally defined as a process whereby the gas at the surface of an article is replaced by a solid (by lamination or deposition) or liquid material, whereby the material adheres (at least temporarily) to the surface of the article. Coatings have been applied in many different manners over the centuries, with each type of coating technology traditionally used for the application of materials within specific fields where the properties and performance of the coating technology fits the desired end result of the article. For example, where coatings of variable thicknesses can be tolerated, simple dip coating may be performed. Where variable thicknesses are tolerable and difficult (rough, angled, shaped, mated) surfaces are to be coated, application by brushes or spraying has been satisfactory. In imaging technologies, where the coating is applied as an image, various forms of printing are available, such as gravure printing, relief printing, lithographic printing, bubble jet printing, electrostatic printing, screen printing, and the like. Some of these printing technologies have also been used for providing coating onto substrates, whether or not the coatings must be discontinuous or continuous.

There are also many different generic types of coating processes. For example, in addition to the dip coating, brush coating, and spray coating already mentioned, common forms of coating include knife edge coating (including air knife coating), gravure coating, roller coating, immersion coating, reverse roll contact coating, extrusion coating, meniscus coating, curtain coating, slide coating and slot coating. Many of the highly efficient and precise coating technologies such as the meniscus, curtain, and slot coating systems have been developed and commercially used extensively in the manufacture of imaging media. The extreme quality and precision of the coatings needed for high quality imaging media, such as photographic film, photothermographic film, instant photography, and the like, require the most advanced coating techniques available.

After initial usage in the imaging technologies, the use of slide coaters, slot coaters and multiple slot coaters expanded into other fields of technology. For example, U.S. Pat. No. 5,500,313 makes general reference to slot coating as an alternative in the manufacture of holographic flake pigment. The materials are coated, imaged and then converted into particulates for subsequent inclusion in binders.

U.S. Pat. No. 5,641,544 describes a method for forming ultrathin coatings of liquid onto substrates and discloses a multiple slot die coating system in which multiple layers of liquids are simultaneously deposited onto a surface. Amongst the materials described as being coatable by the process (column 8, lines 3–32) are optically active coatings, reflective sheeting, functional coatings, and the like. The coating fluids described include solutions, solid-fluid dispersions, fluid mixtures and emulsions.

The present invention describes a method for forming sheets and pigments which comprises wet coating alternating layers of materials which form solid layers of differing refractive indices, solidifying the wet coatings into a sheet comprising layers of solidified material, and breaking the solidified material into pigment particles. The pigment particles usually come in two distinct formats, 1) the pigment having a center opaque reflective layer and 2) a pigment having layers of transparent reflective interference layers. The first format (the center reflective pigment) may comprise as few as at least five layers (e.g., a center layer, and on each opposite side of the center layer at least one pair of layers having differing indices of refraction). The second format (the layer reflective format) comprises at least five or at least six transparent layers (without an intervening reflective layer) which create internal interference patterns. Preferably each pair of layers (each adjacent pair, excluding the reflective layer or surface protective layer) comprises at least two layers whose indices of refraction differ by at least 0.10, more preferably by at least 0.12, and still more preferably by at least 0.14, 0.16, 0.18, 0.20 or at least 0.25. These layers should each have dry dimensions of from 50 to 220 nm, preferably from 80 to 200 nm, most preferably from 80 to 140 nm for each of the layers. To date, the most preferred thickness for the low refractive material is between 90 and 110 (approximately 100 nm) and between 80 and 100 (approximately 90 nm) for the high index material. The pigment particles display enhanced optical variability by the use of more than five layers, such as pigments with multiple pairs of layers differing in their refractive indices, such as two pairs of alternating refractive indices (low-high-low-high) on each side of the center layer, three pairs, four pairs, five pairs, etc. on each side of the center layer. There need not even be a center layer, with any number of layers and pairs of differing layers being useful. The increasing effectiveness of multiple layers may tapered off by the time thirty layers has been reached, but pigments with forty or fifty coated layers are practicable and contemplated within the present invention. It is believed that additional control over the precise thickness of layers and elimination of particulate contaminants from the air can still further improve the optical effects, especially in these particles with greater numbers of layers, where the effects are multiplied.

The optically variable pigments of this invention may have at least two of at least four solid layers comprising an inorganic oxide, and each of the at least four solid layers may have a dry thickness of between 90 and 220 nm. The optically variable pigments may have at least three of the at least four solid layers comprise polymer transparent polymeric coatings and each of the at least three of the at least four solid layers may have a dry thickness of between 90 and 220 nm. The optically variable pigments may have at least four solid layers that comprise solid inorganic oxide layers.

Optically variable pigments are described that comprise particles of at least four layers, the particles having length and width which are longer than its thickness, each layer of the at least four layers having a different index of refraction than each adjacent layer, the four layer material displaying optically variable properties when viewed in visible light as said light has its angle of incidence varied against the four layer material, and fewer than 5% of the number of said particles having any surface layers which extend continuously from one surface formed by its length and width to another surface formed by its length and width.

The primary prior art process for the manufacture of optically variable particles has been the coating of seed particles by vapor deposition techniques. These techniques provide coatings to all exterior surfaces of the particles, as the vapor chamber cannot distinguish between the major surfaces (e.g., having length and width) and the minor surfaces (the edges formed by length and thickness or width and thickness). Therefore, pigments made according to prior art processes comprises the central layer having alternating continuous layers of materials covering all surfaces of the pigment, much like the layers of a pearl. The pigments of the present invention, being formed initially from a sheet of material that is fractured or ground into particles, will not display continuous coatings on all edges of the particles. Although the pigments of the prior art, after formation by vapor deposition, may have been subject to some degradation, intentional or otherwise, those pigment particles, even when reduced to one-tenth their original size, will display continuous coatings from one major surface to another on more than 3% by number and more than 5% by weight of the particles. It is preferred in the practice of the present invention that less than 2% by number, preferably less than 1.5% by number, more preferably less than 1% by number, and most preferably less than 0.5% or less than 0.025% by number have no major surface layer which is connected by a continuous layer of the same composition to another major surface layer.

This material of the present invention can also be described as an optically variable particle comprising at least three layers of transparent materials, comprising a first pair of layers comprising a first layer adjacent to a second layer, and a second pair of layers comprising said second layer being adjacent to a third layer, with each adjacent layer being optically connected to each transparent layer to which it is adjacent, each layer within each of said pairs of layers differing in refractive index from another layer in said each pair of layers by at least 0.12, and each particle having edges approximately perpendicular to said pairs of layers, said edges having no continuous layer of material which forms a continuous layer which is perpendicular to said pairs of layers nor is a continuation of one of said layers within said pairs of layers.

These can also be described as an optically variable particle comprising a reflective layer having at least two layers of transparent materials on each side of said reflective layer, said at least two layers on each side of said reflective layer forming two pairs of optically interactive layers, each optically interactive pair of layers comprising a first layer adjacent to a second layer, each first layer being optically connected to each second layer to which it is adjacent, each first layer within each of said pairs of layers differing in refractive index each adjacent second layer in said pair of layers by at least 0.12, and each particle having edges approximately perpendicular to said pairs of layers, said edges having no layer of material which forms a continuous layer which is a) perpendicular to said pairs of layers nor is a b) continuation of one of said layers within said pairs of layers.

The preferred compositions for deposition of the individual layers which comprise the various refractive indices layers are selected from polymeric layers and inorganic oxide layers (e.g., formed from coatings of sol-gel layers), layers formed by the consolidation of metallic, metalloid, semimetallic colloidal particles, usually metal oxides, halides, or organics, mixtures of these materials or the like. Any material known within the sol-gel, colloidal dispersion art which can be solidified, whether by condensation, hydrolysis, dehydrolysis, chemical or ionic reaction or any other mechanism, into a layer with an index of refraction can be used in the practice of the present invention. It is also possible to wet coat out at least two of the layers according to this practice of the invention and add layers by vapor deposition or chemical deposition techniques. It is advantageous to coat out at least four layers by wet coating technology, and more preferably to coat out at least eight layers by wet coating techniques for each pigment according to the practice of the present invention. It is most preferred that all layers of the pigment (except for a central or asymmetrical carrying layer) be coated out by wet coating techniques. It is preferred that at least one layer having a first refractive index (e.g., on each side of the pigment) have two adjacent layers which have second refractive indices which differ from the refractive index of the at least one layer in the same manner (e.g., each of the two layers has a higher index or each of the two layers has a lower index of refraction).

Any dimension of the layers which allows for the interference effects to assist in the generation of optical variations may be used in the practice of the present invention, but there are practical limitations in the ultimate size of the pigments and their usefulness as the number of layers increase. Each dry layer which is coated out and then formed in the formation of the pigments may comprise, for example, from 90 to 220 nm in thickness, preferably from 100 to 200 nm in thickness, more preferably from 100 to 190 nm in thickness for each layer. The larger the number of layers on a pigment, the greater the tendency there is to have thinner layers. The thickness of the layers, especially the thickness of the outermost layer, is a significant factor in the control of the colors that may be created by interference patterns within the sheet or pigment. The remaining layers underneath the first (outermost layer) affect the colors and may actively sharpen or refine the wavelength distribution of the colors, but it is the layer first struck by light which most greatly influences the reflected color.

In the formation of these thin layers, it is understood that the coated wet layer thickness must be larger than the intended dry layer thickness. For example, in forming a 100 nm layer, a 10 micrometer layer of 1% solids is a rule of thumb thickness that would have to be wet coated. The more concentrated the wet coating composition, the thinner the wet thickness of the coated layer would have to be to obtain a given thickness. The coating compositions may have any concentration of materials which, when dried, will provide a substantive layer having the desired optical and physical properties described herein. Compositions of from 0.05% by weight solids (when coated) to compositions of over 70% by weight solids are useful. Preferably compositions of between 0.1% and 40% are used, more preferably of from 0.5% by weight solids up to 30% by weight solids, and most preferably coating compositions of from 0.5% by weight solids up to 10, 15 or 20% by weight solids are used in applying the layers according to the present invention).

An important aspect of the present invention is the application of the wet liquid precursor to the layers providing the various indices of refraction is the fact that the coatings are done on each other in a film forming operation, rather than having the coatings applied to pre-existing particles or pigment seeds. The coating operation may be done one side at a time on a film which becomes a core of the particles, may be coated two sides at a time on a core, may be coated onto a strippable or removable substrate with or without a core central opaque reflective layer, or the like, the dried solid pigment-forming sheet or film formed, and then the pigment film broken into pigment particles, as by grinding, pulverizing, shredding cutting, combinations of these processes, or the like. Although decorative metal particles have been manufactured by vapor deposition of a film onto surfaces and then formed into particles by breakage of the film (e.g., U.S. Pat. No. 5,312,683), the formation of multiple layers of materials by liquid coating processes, with critically different refractive indices and subsequent breakage of the multiple layered material into optically variable pigments is novel. This process provides a fast, economical way of providing high volumes of optically variable pigments, with much better control over the characteristics of the optical effect because of the ability to multiply layers without extraordinary coating costs.

Many layers can be coated out at one time and solidified at the same time by controlling the coating characteristics of the various coating solutions. The coating solutions should be dried before the layers can intersperse and reduce the differentiation in indices of refraction between the various layers, and this tendency to intersperse can be effected in many ways known for addressing the desire to prevent mixing of layers in coating operations. For example, incompatible solvents may be used, different surfactants may be used, different ionic properties may be present in the adjacent layers, high viscosity materials may be used which will not flow into each other as easily, etc.

The liquid layers used to form the refractive, layered coatings of the present invention may be coated at the wet thicknesses necessary to predetermine the dry thicknesses of the finished layers based upon conventional knowledge of the skilled coating engineer. For example, based on the proportions of liquid carrier to solids, the dried thickness can be readily estimated, and with many compositions, the precise conversion from wet coating thickness to dried coating thickness is well understood. If the dried composition is subsequently reacted (e.g., hydrolyzed, dehydrated, polymerized, crosslinked, etc.), the physical effects of those reactions or changes must also be considered in the estimates of the thickness of the layers. Some reactions will cause expansion or increase in thickness and other layers will cause retractions or shrinkage of layer thickness. These phenomena are well appreciated in many coating operations, but are particularly of import in the practice of the present invention where both the individual layer thickness and the relative layer thicknesses are important. Viscosity is not itself a critical factor in the final layer thickness, as the viscosity is usually a result of the relative proportions (already considered in the thickness estimates) and nature of the components. However, viscosity is important in slot die coating operations (and many other types of coating procedures) in insuring that the layer is uniform and properly laid down on the substrate. In most liquid film flow coating operations, of which slide coating, slot coating and multilayer die slot coating are but two forms, the viscosity is important in at least two ways. The coating composition must not have so low a viscosity that it will immediately flow off the surface onto which it is coated. If this were to occur, there could be too little control of the thickness of the layer and the uniformity of the material. To some degree, as shown in U.S. Pat. No. 5,641,544, low viscosity layers may be coated in conjunctin with higher viscosity layers, with the higher viscosity layers being able to support the lower viscosity layer during the coating procedure. This is especially true where a lower viscosity layer is sandwiched between two higher viscosity layers during the coating procedure. The coating compositions must also not have such a high viscosity that the composition will have such a high internal cohesion or elasticity that the coating composition distorts during coating. The composition should flow sufficiently well as to form a uniform stream or film flow as it passes out of the die head and is picked up and carried by the support surface onto which it is coated.

Figure 2:
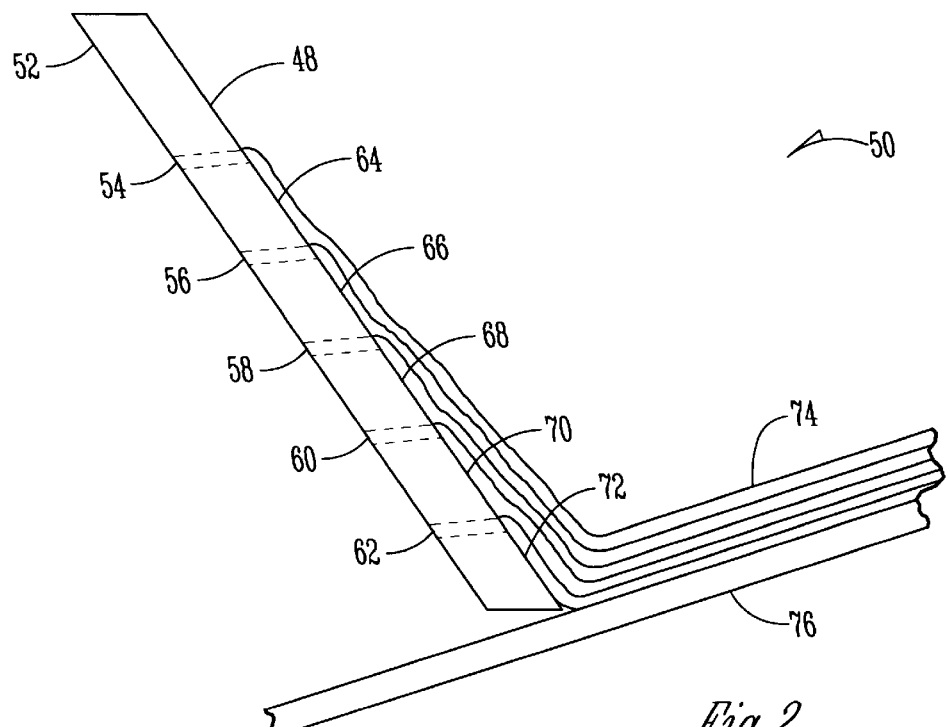
FIG. 2 shows a multiple slide coater useful in the practice of the invention.

The multilayer die slot coater or slide coater may be described in reference to FIG. 2 as follows. The slide coating apparatus 50 comprises a main coating head or frame 52 which has die slots 54, 56, 58, 60 and 62 which feed the individual layers 64, 66, 68, 70 and 72, respectively which are to be coated. Each of these layers, beginning with the highest emitted layer 64, move down the face 48 of the main coating head 52, most preferably in a true laminar flow. As the flowing composition of layer 64 moves towards die slot 56, where layer 66 is emitted, this first emitted layer 64 moves over the second emitted layer 66, forming a dual layer of preferably laminar flow. Similarly, this combination of layers 64 and 66 consecutively combines (preferably in laminar flow) with layers 68, 70 and 72, forming the five layer flowing system 74 supported by the moving carrier layer 76. The speed and volumetric rate of each of the individual layers 64, 66, 68, 70 and 72, and the speed of movement of the support 76 must be controlled to maintain uniform coating and laminar flow, as is understood in the photographic coating art.

Figure 3:
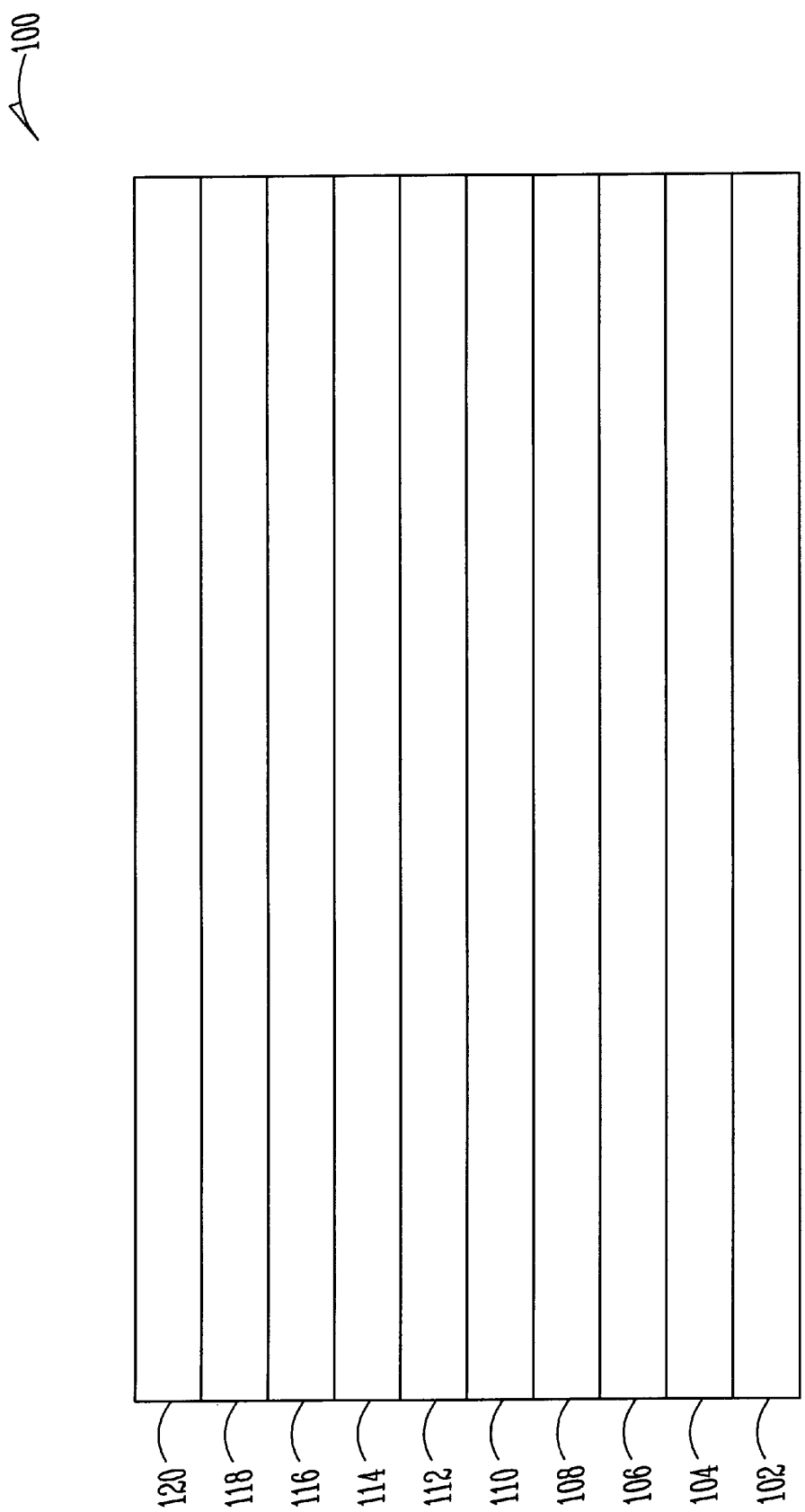
FIG. 3 shows a cross-section of a preferred pigment according to the present invention.

As noted above, the primary effects in providing the multilayer or optically variable pigments of the present invention is in the structure and properties of the respective layers within the pigment formed by the coating operation. The various layers should have optical properties, namely the index of refraction, which varies between adjacent layers. For example, FIG. 3 shows a cross-section of a pigment particle 100 of the present invention, the particle comprising 10 layers 102, 104, 106, 108, 110, 112, 114, 116, 118 and 120. These layers can be considered in pairs (e.g., 102 and 104, 104 and 106, etc.) and triads (e.g., 102, 104 and 106; 110, 112 and 114, etc.) for purposes of evaluating the optical effects and interactions of the layers. There must be a difference between the index of refraction of each adjacent layer for the interface between those layers to have an optical alteration effect. If there is no difference between the two indices of refraction, there will be essentially no light effect at the interface, the two layers acting as a single layer for purposes of optical variation. The degree of difference between the respective refractive index of each layer is based upon the properties of the individual materials used for each layer an on the manner in which that layer is formed. Variations in drying conditions, amounts of reagent and additives (e.g., surfactants, coating aids, etc.) can also effect the index of refraction of a layer. The index of refraction may vary over the wavelength of incident light and with respect to other physical or environmental factors. The index will be assumed to have been measured for all layers at a single wavelength (e.g., 589 or 589.32 nm is a standard reference wavelength used) when wavelengths are compared.

The index of refraction of solid materials may generally be considered to vary over a wide range, e.g., from 1.338 for cryolite, $Na_3AlF_6$, to 3.06 for orpiment, $As_2S_3$. There are a great number of materials available with indices of refraction between 1.35 and 2.6 that can be used in the practice of the present invention. If the materials to be used as the layers can not be formed into the layers, they may be coated out in minor proportions (e.g., less than 20%, preferably less than 10% or less than 5% by weight) of binders. The use of crystalline forms or platelet forms of crystals or materials would work especially well in binder layers as the ability to physically orient the particles within the layers would be helpful in controlling the index of refraction. The use of polymer films is particularly well suited for forming the individual layers of transparent materials within the optically variable sheets and pigments of the present invention.

As previously noted, the index of refraction between adjacent layers should exceed 0.02 to provide a significant optical effect. It is preferred that the differences be as great as possible, as larger differences provide for greater interference effects. Differences of at least 0.10, preferably at least 0.12, more preferably at least 0.14, still more preferably at least 0.16 or 0.18, and most preferably at least 0.20 or at least 0.25 are most preferred. As shown in FIG. 3, there are many layers (e.g., the ten layers 102, 104, 106, 108, 110, 112, 114, 116, 118 and 120) which can add to the effects. The differences in refractive indices should exist between each pair of adjacent layers to provide the greatest effects. The order of the indices of refraction need not be progressive, neither having to increase or decrease in moving from layer 102 to layer 120. For example, the layers may have the following ordering of indices of refraction, 102(1.5), 104 (1.25), 106(1.5), 108(1.25), 110(1.4), 112(1.3), 114(1.25), 116(1.45), 118(1.35) and 120(1.50). In this arrangement, each layer (except for the most exterior layers) is sandwiched between two layers of differing indices of refraction. It is to be noted that each layer does not have to be sandwiched by layers which differ in the same manner from the center layer (e.g., note layers 110(1.4), 112(1.3), 114 (1.25), where each relatively exterior layer differs in the index of refraction from the relatively center layer 112, but layer 110 has a higher index while layer 114 has a lower index. It would be more common to have the layer properties organized in the following manners:

Format I 102(1.5), 104(1.25), 106(1.5), 108(1.25), 110 (1.5), 112(1.25), 114(1.5), 116(1.25), 118(1.5) and 120 (1.25), Format II 102(1.5), 104(1.25), 106(1.5), 108(1.25), 110 (1.6), 112(1.3), 114(1.55), 116(1.35), 118(1.55) and 120(1.30) for purposes of convenience and simplicity. Format I would normally comprise only two compositions coated out in alternating order to provide the optically variable effects when dried.

There are a number of factors that influence one or both of the index of refraction and the interpenetration of adjacent layers in the coating process of the present invention. One factor is the compression or degree of fusion of particles when using a latex or sol to prepare the transparent layers with varying indices of refraction. When sols are used, for example, the particles from the sols will not readily form a truly continuous layer. The particles will first undergo normal packing arrangements. With spheres as the particles, for example, the sol particles would pack (without reaction or melt fusion) to about 66.67% solids and 33.33% space between the spherical particles. As is well known in the optics art, air space between particles (as with bubbles within layers) will reduce the index of refraction. This may be beneficial to some degree when attempting to coat the lower index of refraction layers (although some haze may be attributable to the air space), but would be less desirable (although unavoidable to some degree) in the higher index of refraction layers. The degree of packing attained with the sols may be affected by the pressures, temperatures, solvents and/or additional binder (if any) present in the coating composition. The absolute concentration of particles in the sols will have little or no impact on the packing as that is a geometric function.

The percent of space which is contributed to the sol derived layer from non sol particles (herein referred to as air space, dead space, open space, dispersing space, non-continuous space, open phase, and the like) may be adjusted by the carious techniques noted above. The simplest way to reduce the dead space between particles is by annealing, heating or sintering the particles for an extended period of time at elevated temperatures to cause the particles to soften and flow into the dead space. This can be done at temperatures compatible to the substrate and the necessary materials in the layers. Unnecessary materials may be eliminated by burning at this stage as a side benefit. Under normal drying conditions for the sols, the packing distribution is such that there is approximately 25% dead space. Heating (e.g., at extended periods of 15 minutes to ten hours, for example, at temperatures of from 200° C. to 1000° C., preferably from about 300 to about 800° C. for one to six hours) can reduce the dead space to less than twenty percent (20%), less than 15%, less than 12%, less than 10%, less than 8%, less than 6% and even less than 5%. There are some cost factors involved in the use of high energy costs in maintaining these temperatures that may not be warranted during production.

However, the capability is there for more continuous coatings if desired.

The percentage of dead space my also be affected by the appropriate selection of particle distribution within the sols. Sols are normally provided or selected with essentially monomodal distribution. Sols or sol mixtures may be chosen with more than one particle size range. For example, a blend of two different sols may be mixed, e.g., one with an average particle size of 1 micron, and the other with an average particle size of 0.25 microns. By mixing the two sols, the particles may align themselves (without the need for heating) to provide a layer with only about 20–25% dead space. By mixing two different sizes, the space between the larger particles is, in part, better filled with the small particles. Because these are not dry particles, but in suspension, the smaller particles do not readily distribute themselves towards the bottom of the mixture. It is usually more efficient to combine sols with average particle sizes differing by at least 25% (the larger being at least 25% number average greater in average diameter than the smaller) to gain from this effect.

Controlling the viscosity of the various layers during coating is also another important feature in effecting reduced interpenetration of the adjacent layers and also in controlling the uniformity of the thickness of the layers. If the viscosity is low, e.g., the normal viscosity of many sols is about 1–3 cps at room temperature, the layers tend to intermix, there can be fluid drag as each layer is deposited on another layer, and each of these factors causes reduction in the uniformity an consistency of the layers. It has been found in the practice of the present invention, for example, that the use of sols with viscosity levels of 1–3 cps can create layer thickness variations on the order of 40 to 50%. Although this can be acceptable where color variations are tolerable, it is not desirable where a single color is intended to be provided by the pigment. By increasing the viscosity of the sol solution, as by the addition of thickening agents, the viscosity may be increased (e.g., up to a preferred maximum of 100 cps, preferably between 15 and 100, more preferably between 20 and 80, still more preferably between 25 and 70 cps, and most preferably between 25 and 60 or 30 to 50 cps. Preferred thickening agents comprise water soluble polymers, especially water-soluble organic polymers, and most preferably water-soluble polymers having hydroxyl or carboxyl groups thereon such as acrylic resins and CARBOPOL™. Polyvinyl alcohol is not generically preferred because with some (but not all sols) it may force the colloids out of suspension or cause foaming. Thickening agents may be used in any amount needed to attain the desired viscosity levels, although large amounts of inefficient thickeners would be undesirable. Normal ranges of use would be about 0.001% by weight to 1 or 2% by weight of the dispersion. The dispersion itself may contain about 0.5 to 10% solids (of the inorganic oxide, for example), preferably about 1 to 3% solids of the sol material. This would put the ratio of thickener to sol in the theoretic range of from 0.0001:10 to 1:1. A preferred range would be more on the order of about 0.0005 to 0.5, more preferably from 0.01:1 to 0.5:1 thickener to sol particle, or whatever amount is needed to achieve the desired viscosity.

The preferred size range for the sol particles is generally between 0.005 and 1 micron. Sols may also vary dependent on their chemical nature. For example, the preferred range of particle sizes for the combination in two different layers of monomodal zirconia sols is between about 0,05 and 0.2 microns and for the monomodal silica sols as alternating layers with the zirconia sols, between about 0.005 and 0.4 microns.

There are also two basic formats of pigments and sheets according to the practice of the present invention. One format has an internal reflecting layer (e.g., aluminum, copper, chrome, etc.) with the optically variable layers coated according to the practice of the present invention. In this format, two layers (one pair of layers) on each side of the central reflecting layer are sufficient to provide an optically variable sheet or pigment according to the present invention. The pair of layers is preferably coated onto both sides of the reflecting sheet, but may be coated on a single side of the sheet.

The second format does not require a reflecting layer, and in fact, all layers should be transparent. This format relies entirely upon the internal reflection of light from the interfaces of the layers to provide the reflected light to a viewer. Because of the lower reflective efficiencies of this format, although it is a preferred construction, at least five transparent layers with adjacent layers having different indices of refraction are desired. At least six such layers are preferred, at least eight such layers are more preferred, with 20, 30 or more layers being useful. At more than 20 layers here tends to be an increase in off-angle light effects, which may not be preferred in certain areas of use of the materials of the present invention. Additionally, as the benefits of additional layers tends to be at best marginal beyond that point, the costs associated with additional layers (material costs, processing costs such as refined equipment, additional heating/drying,) and the potential for greater variation in material due to the increased number of variables (e.g., more layers), 5–20 or 5–25 layers are preferred, 6–20 or 6–25 layers are more preferred, and 8–20 or 8–25 layers are most preferred.

The degree of reflectivity in the resultant pigments is provided by a combination of balance between the number of layers and the relative refractive index between the adjacent layers. Where a system is provided of only two alternating compositions, if a reflectivity approximating 100% is desired with twenty layers in a format two pigment, then the relative ratio of refractive indices, $\eta_1/\eta_2$, should be about 1.57. A higher ratio would, of course, be unable to provide higher reflectivity (than 100%) with more layers, but fewer layers could be used with higher ratios of the indices of refraction. There are definitely aspects of design which the manufacturer will have control of in selecting the optical properties (and the physical properties) of the final article. Many of these design considerations are specifically discussed within this text.

The types of materials to be used for the individual layers include any materials that would be physically and environmentally stable within the pigment. This means that the materials would not readily react, dissolve or evaporate from one layer into another or out of the pigment. Both organic and inorganic materials may be used. For example, metals, metalloids, semimetals and their oxides, sulfides, nitrides, carbonates, halides, etc. are general classes of inorganic compounds that may be used. Polymers, composites, organic crystalline materials, and the like are various physical forms of layers that may be used in the practice of the present invention. Specific materials which may be used include, but are not limited to layers of organics and inorganics as presently used in the coating and layering arts. Polymers include both aqueous based polymers and organic solvent-based polymers. Aqueous based polymer might include acrylic (and methacrylic polymers), polyvinylpyrrolidone polymers, polyvinyl alcohol polymers, and any other class with solubilizing groups (e.g., carboxylic acid groups, sulfonic acid groups, sulfinic acid groups, phopshonic acid groups, phosphinic acid groups, etc.) attached thereto. It is preferred that the polymer layers be transparent to allow the greatest passage of light through the layers. Some dyes may be present within the layers to influence the color appearance, but clear (colorless) transparent layers are preferred. Organic solvent soluble polymers might include acrylic polymers (may be aqueous or organic solvent soluble), cellulose acetate esters (butyrate or propionate, for example), cellulose triacetate, polyesters, polycarbonates, polyamides, epoxy resins, polyurethane resins, polyethers, polyketones, and the like. Optically variable articles with one organic soluble layer and one aqueous-based polymer layer are also useful.

One feature that should be considered in the selection of the individual layers for the sheets and pigments of the present invention is the relative rate of layer dimension change upon hardening of the layers. If there is too great a differential between the rate/degree of shrinkage/dimensional change in the adjacent layers during hardening, there will be significant forces developed between the adjacent layers. These forces can weaken the bond between the two adjacent layers. If the bond is too weakened, the integrity of the bond may be affected, especially during particalization of the sheet. It is therefore preferred that the adjacent layers condense (shrink/compress/diminish in one dimension, e.g., length) no more than 10% in that dimension during conversion from the wet coating to the solid coating while the wet layers are in contact with each other. That is, for example, if there are two adjacent wet coatings of 10 cm in length, and one coating does not shrink at all during conversion to a solid coating, the other coating should not shrink more than 1 cm during its solidification. More preferably the layers should have a shrinkage differential during solidification of less than 5%, still more preferably less than 2%, yet still more preferably less than 1.5% and most preferably less than 1%.

Inorganic layers, and especially inorganic oxide layers may be formed by dehydration, oxidation, reduction, or drying of sols, dispersions, colloidal dispersions, emulsions, suspensions and the like onto a receptor (temporary or permanent) surface. Such layers may be formed from materials such as in addition to metals/metalloids, and in addition to monometallic, monometalloid compounds as the starting materials, dimetallic (having two different metal/metalloid atoms, bimetallic (having two of the same metal/metalloid atoms in the compound), heterometallic (having one metal and one metalloid atom in the same compound), dimetalloid and bi-metalloid compounds, and mixtures of any of these groups of compounds are useful in the practice of the present invention. Mixtures and blends of the compounds provide unique capabilities for uniformly distributing different properties over a surface, or balancing (averaging) properties over the surface. An extremely wide range of these classes of oxidizable metal or metalloid compounds are commercially available, as exemplified by the lists of compounds in the 1996 Gelest, Inc. chemical catalog (e.g., pages 287 for a generic description of heterometallic and heterometalloid alkoxides, including alkali metal combinations; and especially pages 21–217; 220–221; 231–233; and 258–265) and the 1994 PCR, Incorporated General Catalog of Chemicals for Research Scientists, especially pages 192–193 and 198–199).

Germanium compounds have a functional similarity to silicon compounds in the practice of the present invention. A wide range of these compounds, as shown in the 1996 Gelest, Inc. catalog identified above, as shown particularly on pages 216–217.

Similarly, as indicated above, oxidizable tin compounds are another class of compounds useful equivalently to the silicon compounds preferred in the practice of the present invention. There are many commercially available alternatives within this class, as shown for example on pages 258–264 of the 1996 Gelest, Inc. chemical catalog. Examples of R (as shown in the silicon compound formula above, and equally applicable in corresponding groups attached to other metal or metalloid atoms in the oxidizable compounds of the present invention) are apparent to those of ordinary skill in the art and they may be functional (e.g., specifically reactive) groups or relatively non-reactive groups which may provide useful physical properties when the material is deposited on the surface prior to oxidation, or less likely, leave a residue which is advantageous after oxidation. Such R groups would include aliphatic and aromatic groups such as alkyl groups, alkyl ester groups, poly(oxyalkylene) groups, phenyl groups, naphthyl groups, H, hetero groups (e.g., thioethers), functionally terminated groups such as amino-alkyl, epoxy-alkyl, carboxyalkyl, even possibly halogen atoms such as I, Br, Cl and F (but these are much less preferred because of the halogen products, including halogenic acids) and the like. $R^1$ may be any oxidizable group such as an ester group, including those with their own functionality on the distal (from the position of attachment) end of the group. Such groups $R^1$ after attachment form ester or ester type groups so that $R^1$ is actually an aliphatic or aromatic group such as R, but is preferably limited to aliphatic groups of 1 to 20 carbon atoms, more preferably 1 to 10 carbon atoms, and most preferably 1 to 4 carbon atoms for aliphatic groups and 1 to 10 carbon atoms for aromatic groups. For silicon based compounds, representative examples are the silicone compounds described in U.S. Pat. No. 5,486,631, the reactive silanes of U.S. Pat. No. 4,084,021 and many other commercially available silicon compounds which may be oxidized, particularly at temperatures between 250 to 600° C., and more particularly at temperatures between 350 and 500° C. It is also possible to use low temperature oxidizing environments, such as with oxidizing additives present or oxidizing vapor conditions, or with aerobically carried catalysts or accelerants to enable lower temperature oxidation onto surfaces which ordinarily could not withstand the temperatures used to oxidize the silicon containing materials (or other classes of materials). The oxidation product of this reaction may actually create a direct chemical bond to the composition of the substrate, or may merely create strong physical attachments, but the former appears to be the more likely result based on washing of the surfaces after the oxidation process.

The other classes of compounds include the counterparts of these compounds (i.e., with the silicon replaced by the other elements) such as titanate esters, zirconium esters, and other metal or non-metal esters. Mixtures of the various oxidizable compounds may be used, as suggested above, with particularly beneficial results, providing variations or mixtures of properties on surfaces, discontinuous areas of specific properties, blends (averages of properties), and the like.

A non-exhaustive list of compounds useful within the practice of the present invention includes such materials as: Isobutyltrimethyoxysilane, Aminopropyltriethoxysilane, Aminopropyltriethoxysilane, 3-Methacryloxypropyl-trimethoxysilane, n-(2-Aminoethyl)-3-aminopropyltrimethoxysilane, 3-Glycidoxypropyltrimethoxysilance, n-Octyltriethoxysilane, Hexamethyldisilazane, Diethylsilane, Vinyldimethylchlorosilane, Vinylmethyldichlorosilane, Vinylmethyldimethoxysilane, Tetrakis[1-methoxy-2-propoxy]silane, Triethylchlorosilane, Vinylmethyldiethoxysilane, Vinyltrichlorosilane, Vinyltrimethoxysilane, Vinyltriethoxysilane, Dimethyldiethoxysilane, Hexamethyldisilazane, Divinyltetramethyldisilazane, Tetramethyldisilazane, Heptamethyldisilazane, Tris[(trifluoropropyl)methyl]cyclotrisiloxane, Methylvinylcyclotetrasiloxane, 1,3,5,7-Tetramethylcyclotetrasiloxane, 1,3,5,7,9-Pentamethylcyclopentasiloxane, Hexamethyldisiloxane, Divinyltetramethyldisiloxane, Divinyltetramethyldisiloxane (high Purity), Tetramethyldisiloxane, 1,3-Bis(3-aminopropyl)tetramethyldisiloxane, Heptamethyltrisiloxane, Chlorinated phenyl methyl polysiloxane, 1,3Bis(aminopropyl)tetramethyldisiloxane, Bis(3-aminopropyl)polydimethylsiloxane, Bis(3-aminopropyl)polydimethylsiloxane, Diethoxy polydimethylsiloxane, Tris(trimethylsiloxy)3-mehtacryloxypropylsilane, Tetraisopropoxygermane, Tetrakis(Trimethylsiloxy-Germane, Tetramethoxygermane, Tetramethylgermane, Tetrapentylgermane, Tetraphenylgermane, Tetra-n-Propylgermane, Tetra-p-Tolylgermane, Triallylfluorogermane, Tri-n-Butylacetoxygermane, Tetraphenyltin, Tetravinyltin, Tetraphenltin, Tetravinyltin, Tin II Acetate, Tin IV Acetate, Tin Acetylacetonate, Tin t-Butoxide, Tin II Chloride, anhydrous Tin II Chloride, Dihydrate Tin IV Chloride, anhydrous Tin II Ethoxide, Tin II Flouride, Tetramethyltin, Tetra-n-Octyltin, Tetra-n-Pentyltin, Tetraethyltin, Tetraisopropoxytin-Isopropanol Adduct, Tetraisopropyltin, Tetrakis(Diethylamino)Tin, Tetrakis(Dimethylamino)Tin, Potassium Stannate trihydrate, Sodium Stannate trihydrate, Sodium Tin Ethoxide, Stannic Chloride, Tetraacetoxytin, Tetraallyltin, Tetra-t-Butoxytin, Tetra-n-Butyltin, Methacryloxytri-n-Butyltin, Methyltrichilorotin, Phenylethynyltri-n-Butyltin, Phenyltri-n-Butyltin, Phenyltrichlorotin, Divinyldi-n-Butyltin, 1-Ethoxyvinyltri-n-Butyltin, Ethynyltri-n-Butyltin, Hexabutyldistannoxane, Hex-n-Butylditin, Hexamethylditin, Dimethylhydroxy (Oleate)Tin, Dimethyltin Oxide, Dioctyldichlorotin, Dioctyldilauryltin, Dioctyldineodecanoatetin, Dioctyl (Maleate)Tin, Dioctyltin Oxide, Diphenyldichlorotin, Allytrichlorogermane, Allyltriethylgermane, Allytrimethylgermane, 3-Aminopropyltributylgermane, Ammonium Hexafluorogermanate, Ammonium Tris (Oxalato)Germanate, Benzyltricholorogermane, Bis[Bis (Trimethylsilyl)Amino]-Germanium II, Bis(Chloromethyl) Dimethylgermane, Bismuth Germanate, Bromomethyltribormogeunane, Bromotrimethylgermane, Tetra-n-Butylgermane,
Tetraethoxygermane, and Tetraethylgermane.

Preferred silicon compounds of the present invention may be represented by the formula:

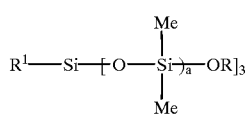

wherein Me is a methyl group,

R$^1$ is an organic group, e.g., an aliphatic or aryl group, preferably an alkyl group having one to ten carbon atoms, R is an alkyl or aryl group, preferably a methyl or ethyl group, and a is an integer within the range of to 12.

Counterparts of these materials where Me is replaced with other organic groups, particularly alkyl groups (of 1 to 8 carbon atoms) are useful in the practice of the present invention, as are the other nominative elemental counterparts (e.g., the titania, germainum, etc. counterparts of silicon).

As used in the practice of the present invention, it is well understood that the art tolerates or even advises on substitution of groups within these chemical formulae. To that end, wherever the term a group is used in described a chemical material or functionality, conventional substitution is specifically included within the description of that term. For example, where alkyl group is recited, not only are alkyl moieties such as methyl, ethyl isobutyl, t-butyl, iso-octyl, and dodecyl included, but also alkyls with such conventional substitution as is recognized within the relevant art, such as hydroxymethyl, 1-, or 2-halo-ethyl, omega-cyano-butyl, propyl-sulfonate, etc. with such substituent groups as amino, carboxyl, acyl, etc. tolerated according to the general practices of the art. Where the term a Amoiety@ is used, as in alkyl moiety, that term reflects only the strict definition of alkyl (or other moiety modified group) without allowance for substitution.

EXAMPLES

A series of five layer optically variable pigments according to the present invention were made as follows. A conventional slide coating apparatus was used with a modified coating head. The head was cut from a solid block of steel with five parallel slots in the coating head. 10 mil (0.25 mm) unsubbed polyethyleneterephthalate film was moved at 15–30 cm/sec. Past the slide coating head. Each of the five layers of coating compositions was passed through the slots in the coating head at 80 ml/min/layer in a coating strip about 10.2 cm wide. The wet thickness of each of the layers was kept between 10–20 micrometers. The layers were air dried in some cases or dried at 93° C. (200° F.) in other cases. The order of the layers was zirconia sol/silica sol/zirconia sol/silica sol/zirconia sol. Concentrations of sol ranged from 1 or 2% solids up to 5 or 10% solids. In two individual examples, the concentrations were zirconia sol 2% and silica sol 1% (by weight solids) and 10% by weight zirconia sol and 5% silica sol. The dry thicknesses of the individual layers ranged from about 0.2 to 0.25 micrometers.

After drying, the 5-layer coating was scraped from the polyester film. The material readily flaked off the film, with very little adhesion noted. The flakes were ground into an optically variable pigment.

Figure 4:
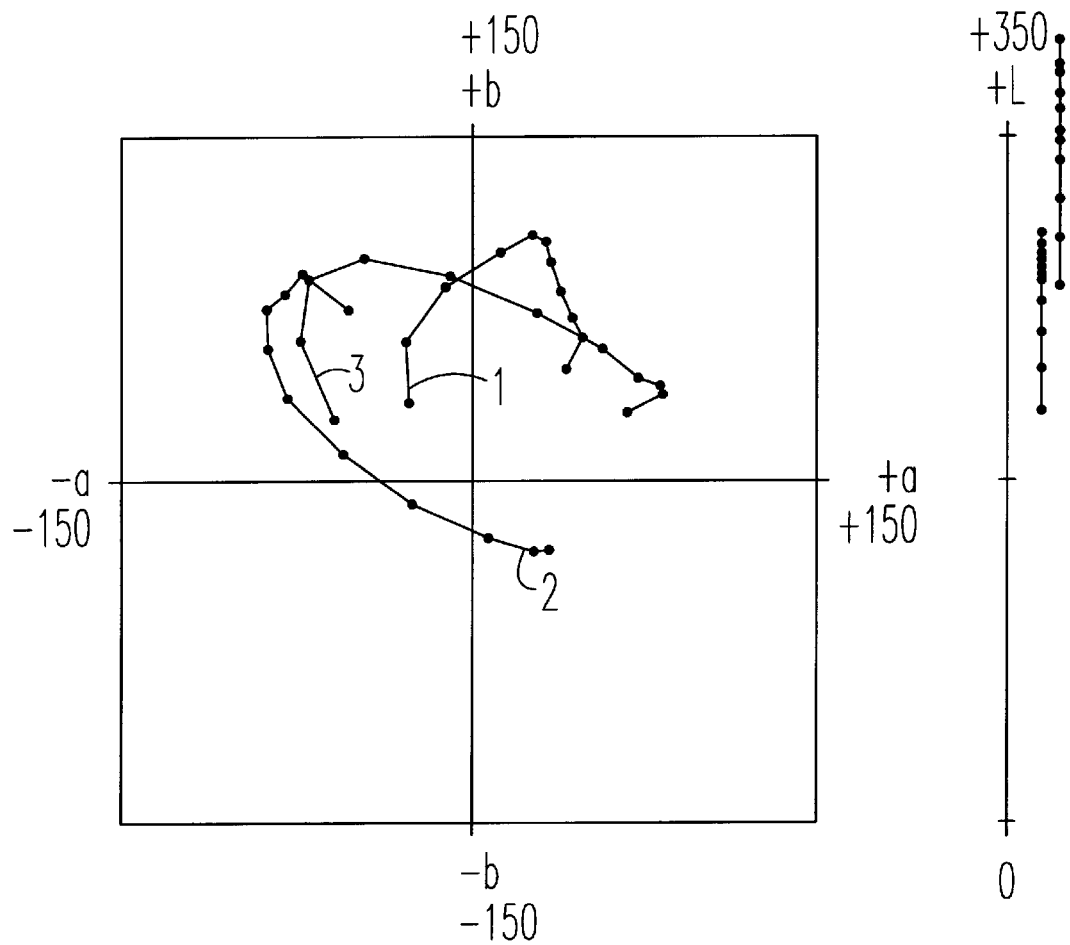
FIGS. 4 and 5 show CIELab color plots for specific optically variable pigments according to the present invention.
Figure 5:
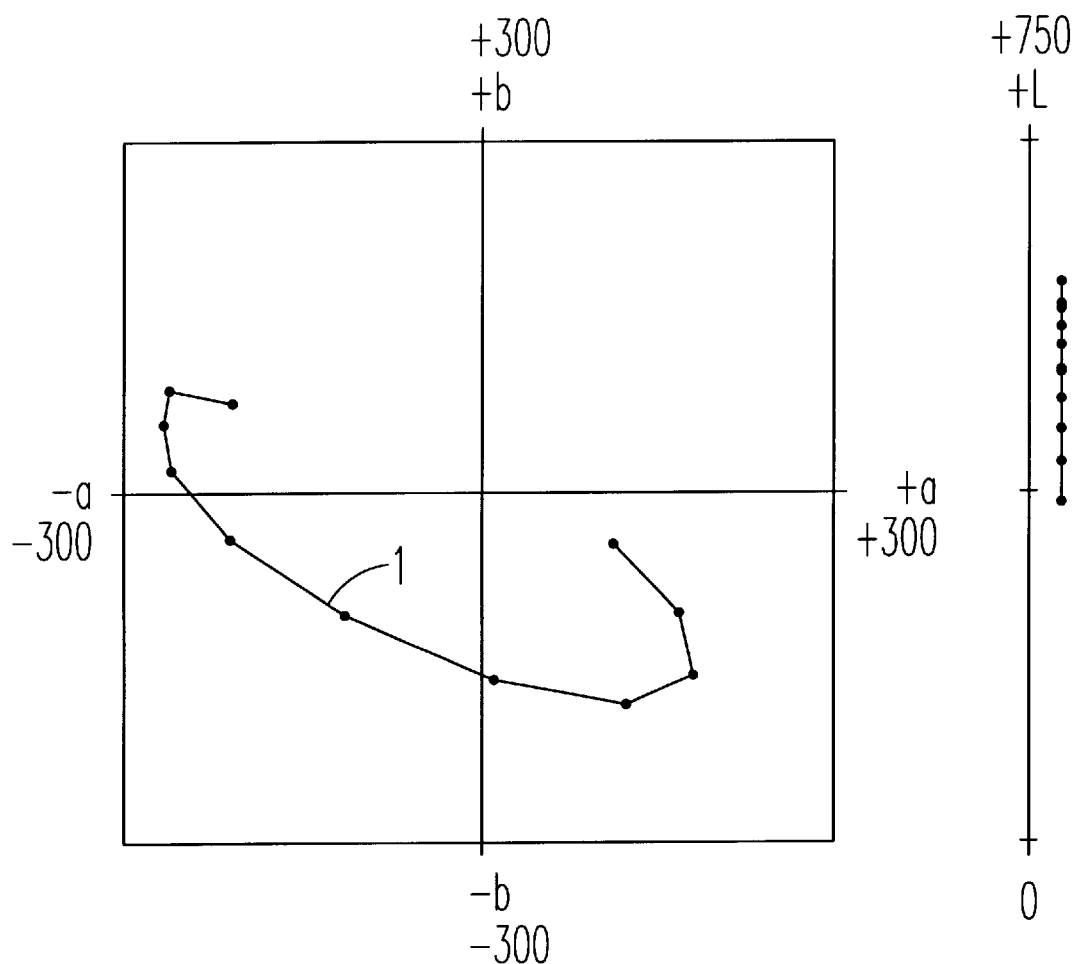

A two layer optically variable pigment was made by the same procedures with the first layer down on the polyester being a 2% by weight solids of poly(vinyl alcohol) and the second layer being 1% by weight solids of zirconia sol. The process parameters were otherwise the same. This two layer material adhered much more strongly to the polyester and more force was needed to remove the two layer material. After grinding, the pigment displayed optically variable properties. When the same or similar compositions were coated onto a polyester base by spin coating, the uniformity of the layer thicknesses was slightly improved and the optically variable properties somewhat better. FIG. 4 shows a CIELab plot for an optically variable pigment made by spin coating according to this procedure.

What is claimed:

1. An optically variable particle comprising a reflective layer having at least two layers of transparent materials on each side of said reflective layer, said at least two layers on each side of said reflective layer forming two pairs of optically interactive layers, each optically interactive pair of layers comprising a first layer adjacent to a second layer, each first layer being optically connected to each second layer to which it is adjacent, each first layer within each of said pairs of layers differing in refractive index each adjacent second layer in said pair of layers by at least 0.12, and each particle having edges approximately perpendicular to said pairs of layers, said edges having no layer of material which forms a continuous layer which is a) perpendicular to said pairs of layers nor is a b) continuation of one of said layers within said pairs of layers.

2. The optically variable particle of claim 1 wherein at least two layers of said optically variable particle are formed of inorganic oxide particles that have less than 15% dead space between adhered fused particles of inorganic oxide.

3. The optically variable particle of claim 1 wherein at least two layers of said optically variable particle are formed of inorganic oxide particles that have less than 10% dead space between adhered fused particles of inorganic oxide.

4. The optically variable particle of claim 1 wherein at least two layers of said optically variable particle are formed of inorganic oxide particles that have less than 7% dead space between adhered fused particles of inorganic oxide.

5. A method of forming optically variable pigments comprising the steps of depositing at least four layers of liquid material onto a substrate, forming solid layers of all of said liquid layers to form an at least four layer material, each layer of said at least four layers having a different index of refraction than each adjacent layer, and then rendering said at least four layer material into particulate form, said four layer material displaying optically variable properties when viewed in visible light as said light has its angle of incidence varied against said four layer material, wherein at least two of said at least four solid layers are formed by depositing as a liquid a sol of an inorganic oxide then forming said sol into a solid inorganic oxide coating, and each of said at least four solid layers has a dry thickness of between 90 and 220 nm.

6. The method of claim 5 wherein each of said at least four solid layers differ in index of refraction from any adjacent solid layer by at least 0.10, and each of said at least four solid layers has a dry thickness of between 90 and 220 nm.

7. The method of claim 5 wherein at least five layers are formed and at least three of said five layers are formed by depositing at least three layers of a liquid polymeric composition and solidifying said liquid polymeric composition into a transparent polymeric coating and each of said at least three of at least four solid layers has a dry thickness of between 90 and 220 nm.

8. The method of claim 5 wherein at least four solid layers are formed by depositing as a liquid a sol of an inorganic oxide then forming said sol into a solid inorganic oxide coating.

9. The method of claim 5 wherein at least twelve solid layers are formed by depositing at least ten wet layers as liquid polymeric compositions and solidifying said liquid polymeric compositions into at least ten transparent polymeric coatings and each of said at least ten transparent polymeric coatings has a dry thickness of between 90 and 220 nm.

10. The method of claim 9 wherein each of said at least twelve solid layers differ in index of refraction from adjacent solid layers by at least 0.12.

11. The method of claim 9 wherein each of said at least twelve solid layers differ in index of refraction from adjacent solid layers by at least 0.20.

12. The method of claim 10 wherein each of said at least ten solid layers differ in index of refraction from adjacent solid layers by at least 0.25.

13. A method of forming optically variable pigments comprising the steps of depositing at least four layers of liquid material onto a substrate, forming solid layers of all of said liquid layers to form an at least four layer material, each layer of said at least four layers having a different index of refraction than each adjacent layer, and then rendering said at least four layer material into particulate form, said four layer material displaying optically variable properties when viewed in visible light as said light has its angle of incidence varied against said four layer material, wherein at least four solid layers are formed by depositing as a liquid a sol of an inorganic oxide then forming said sol into a solid inorganic oxide coating, and wherein each of said at least four solid layers differ in index of refraction from adjacent solid layers by at least 0.10.

14. A method of forming optically variable sheets comprising the steps of depositing at least five layers of liquid material onto a substrate, forming transparent solid layers of all of said liquid layers to form an at least five layer material, each layer of said at least five layers having a different index of refraction than each adjacent layer, and then removing said at least five layers from said substrate to provide a sheet with optically variable colors, whereby said five layer sheet displays optically variable properties when viewed in visible light as said light has its angle of incidence varied against said five layer material, wherein at least two of said at least fiye solid layers are formed by depositing as a liquid a sol of an inorganic oxide then forming said sol into a solid inorganic oxide coating.

15. The method of claim 14 wherein each of said at least five solid layers differ in index of refraction from any adjacent solid layer by at least 0.10, and each of said at least five solid layers has a dry thickness of between 90 and 220 nm.

16. The method of claim 14 wherein at least three of said at least five solid layers are formed by depositing as a liquid polymeric composition and solidifying said liquid polymeric composition into a transparent polymeric coating and each of said at least three of said at least five solid layers has a dry thickness of between 90 and 220 nm.

17. The method of claim 14 wherein at least four solid layers of said at least five solid layers are formed by depositing as a liquid a sol of an inorganic oxide then forming said sol into a solid inorganic oxide coating.

18. A method of forming optically variable sheets comprising the steps of depositing at least five layers of liquid material onto a substrate, forming transparent solid layers of all of said liquid layers to form an at least five layer material, each layer of said at least five layers having a different index of refraction than each adjacent layer, and then removing said at least five layers from said substrate to provide a sheet with optically variable colors, whereby said five layer sheet displays optically variable properties when viewed in visible light as said light has its angle of incidence varied against said five layer material, wherein each of said at least five solid layers differ in index of refraction from adjacent solid layers by at least 0.10.

19. A method of forming optically variable sheets comprising the steps of providing at least two layers of liquid material onto each reflective surface of a two-sided reflective substrate, forming transparent solid layers of all of said liquid layers to form an at least five layer material, each layer of said transparent solid layers having a different index of refraction than each adjacent layer of said transparent solid layers, whereby said five layer material displays optically variable properties when viewed in visible light as said light has its angle of incidence varied against said five layer material.

20. The method of claim 19 wherein the adjacent layers contract at rates which differ from each other by less than 5% when the transparent solid layers are formed.

21. The method of claim 14 wherein the adjacent layers contract at rates which differ from each other by less than 5% when the transparent solid layers are formed.

22. The method of claim 5 wherein the adjacent layers contract at rates which differ from each other by less than 5% when the transparent solid layers are formed.

23. The method of claim 12 wherein the adjacent layers contract at rates which differ from each other by less than 5% when the transparent solid layers are formed.

24. The method of claim 19 wherein said depositing of layers is performed by a coating process selected from the group consisting of slide coating, die slot coating, curtain coating, meniscus coating, and spin coating.

25. The method of claim 20 wherein said depositing of layers is performed by a coating process selected from the group consisting of slide coating, die slot coating, curtain coating, meniscus coating, and spin coating.

26. The method of claim 22 wherein said depositing of layers is performed by a coating process selected from the group consisting of slide coating, die slot coating, curtain coating, meniscus coating, and spin coating.

27. The method of claim 23 wherein said depositing of layers is performed by a coating process selected from the group consisting of slide coating, die slot coating, curtain coating, meniscus coating, and spin coating.

28. A method of forming optically variable sheets comprising the steps of providing at least two layers of liquid material onto each reflective surface of a two-sided reflective substrate, forming transparent solid layers of all of said liquid layers to form an at least five layer material, each layer of said transparent solid layers having a different index of refraction than each adjacent layer of said transparent solid layers, whereby said five layer material displays optically variable properties when viewed in visible light as said light has its angle of incidence varied against said five layer material, wherein said depositing of layers is performed by a coating process selected from the group consisting of multiple die slot coating and slide coating.

* * * * *